June 28, 1932. G. W. BINNS 1,864,578

GRINDING MACHINE

Filed Jan. 25, 1930    2 Sheets-Sheet 1

Inventor
GEORGE W. BINNS
By
HK Parsons Attorney

June 28, 1932. G. W. BINNS 1,864,578
GRINDING MACHINE
Filed Jan. 25, 1930 2 Sheets-Sheet 2
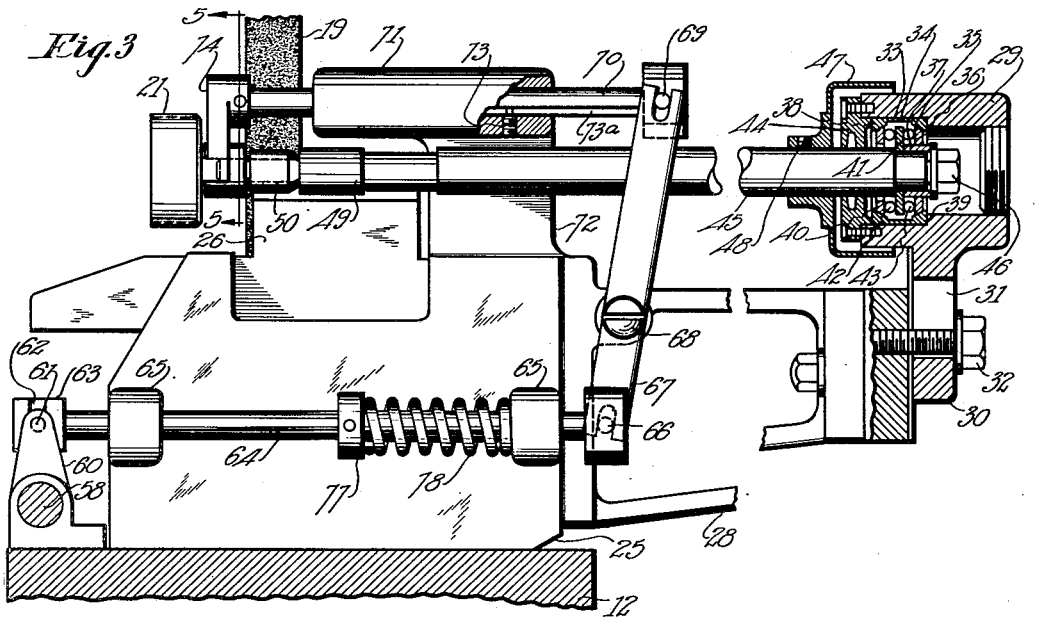
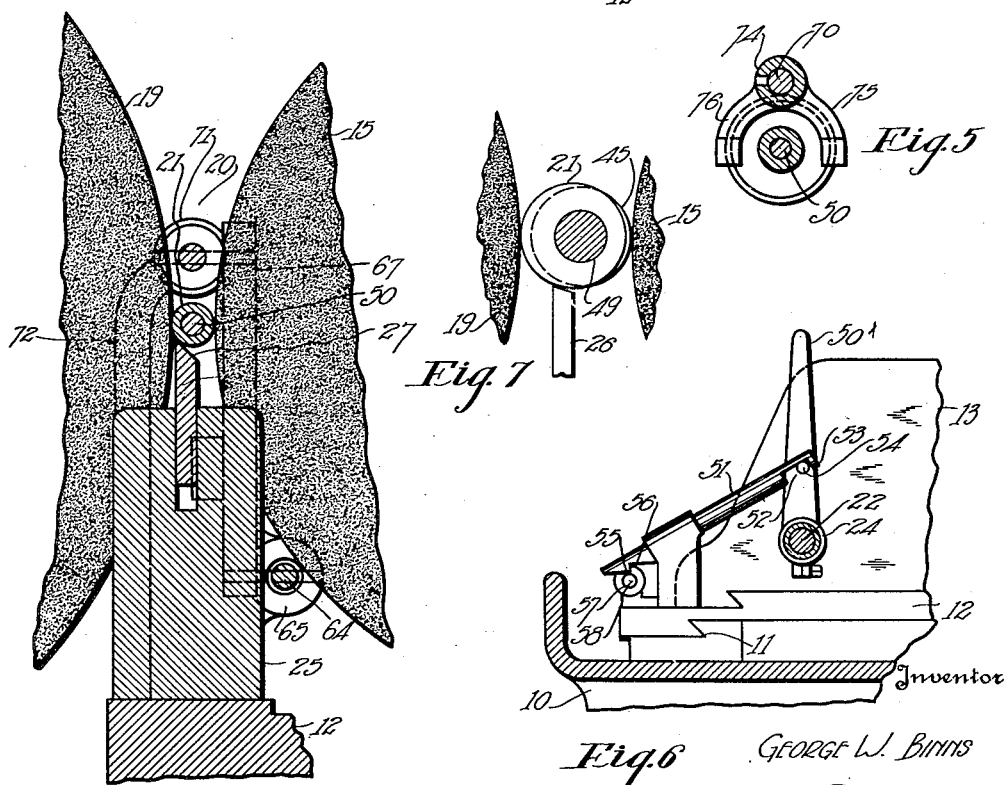
Inventor
GEORGE W. BINNS
By HK Parsons
Attorney Patented June 28, 1932

1,864,578

UNITED STATES PATENT OFFICE

GEORGE W. BINNS, OF CINCINNATI, OHIO, ASSIGNOR TO THE CINCINNATI GRINDERS INCORPORATED, OF CINCINNATI, OHIO, A CORPORATION OF OHIO

GRINDING MACHINE

Application filed January 25, 1930. Serial No. 423,529.

This invention relates to improvements in machine tools and especially to improvements in centerless grinders.

An object of the invention is to provide a device of the centerless type for grinding a portion or portions of a work piece concentric with a previously finished portion thereof.

Another object of the invention is to provide a centerless grinder for exteriorly grinding the surface of a work piece concentric to a finished bore therein.

Other objects and advantages of the present invention should be readily apparent by reference to the following specification considered in conjunction with the accompanying drawings and it is to be understood that any modifications may be made in the structural details without departing from or exceeding the spirit of the invention.

Figure 3 is a sectional view taken on line 3—3 of Figure 1.

Figure 4 is a sectional view taken on line 4—4 of Figure 2.

Figure 5 is a sectional view taken on line 5—5 of Figure 3.

Figure 6 is a fragmentary end elevational view of the device shown in Figure 1.

Figure 7 is a view similar to Figure 4 showing a modification of the invention.

Throughout the several views of the drawings similar reference characters are employed to denote the same or similar parts.

Figure 1:
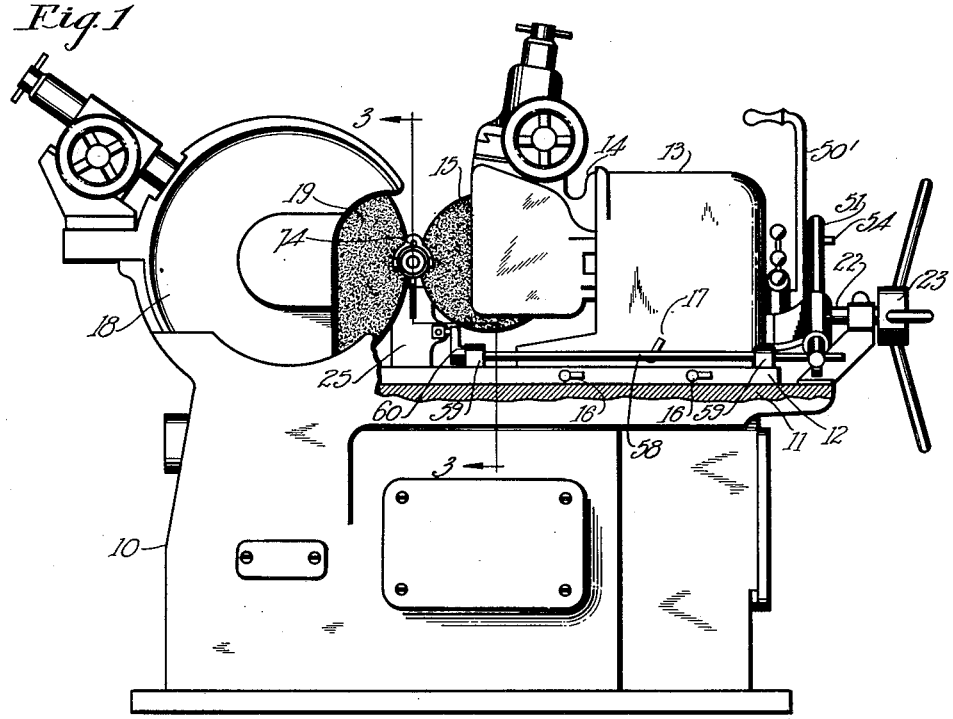
Figure 1 is a front elevation of a machine embodying the improvements of this invention.
Figure 2:
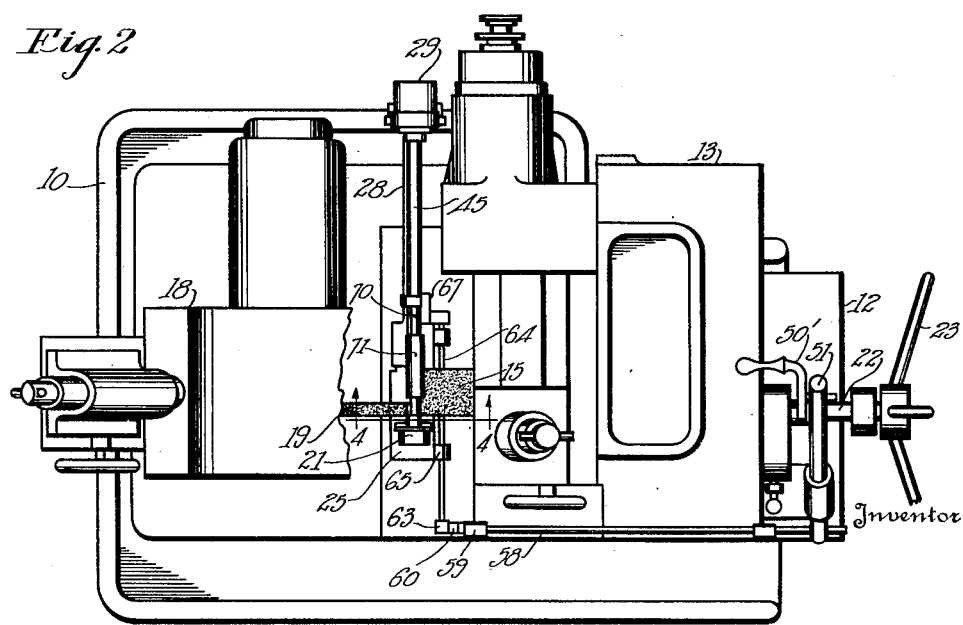
Figure 2 is a top plan view of the machine shown in Figure 1.

The numeral 10 designates the bed having formed on the upper surface thereof ways 11 supporting for longitudinal adjustment the lower slide 12. An upper slide 13 having the regulating wheel unit 14 rotatably supporting the regulating wheels 15 is mounted on the upper surface of slide 12 for longitudinal adjustment thereon and therewith. Clamps 16 and 17 are provided for respectively locking lower slide 12 to table 10 and upper slide 13 and regulating wheel unit 14 to the said lower slide 12. The bed 10 in addition supports the grinding wheel unit 18 rotatably supporting the grinding wheel 19 in peripheral opposition to the regulating wheel 15. The grinding and regulating wheels form a grinding throat 20 between the active surfaces thereof in which a work piece such as 21 is positioned. To adjust regulating wheel 15 relative to the grinding wheel 19 to determine the size of the grinding throat use may be made of screw 22 having mounted on the end thereof hand or pilot wheel 23 and having the other end in threaded engagement with a nut 24 carried by the regulating unit 14.

The foregoing description deals with a centerless grinder as heretofore known and produced to which the improvements of this invention have been applied. To support the work piece 21 during grinding and to take up the grinding thrust on the work piece the lower slide 12 is provided at its forward end with a block 25 carrying a work rest blade or work support 26 having an inclined top 27 inclining toward the regulating wheel. Extending rearwardly from the block 25 is a bracket 28 having adjustably secured to its rear end a housing 29 provided with a depending lug 30 in which an elongated opening 31 is formed having extending therethrough the clamp screw 32 for adjustably locking the housing 29 relative to the bracket 28. Housing 29 is provided interiorly thereof with a counterbore 33 receiving a sleeve 34 having concaved or dished flange 35 receiving a complementary contoured outer race 36 of a double anti-friction thrust bearing 37. A second concaved or dished flange 38 is formed on the other end of the sleeve 34 engaging the complimentary contoured inner end race 40 of the double anti-friction thrust bearing 37. An intermediate plate 41 is provided between the end races 36 and 40 and forms on its opposite surfaces the other races for the balls 42 and 43. A cap nut 44 is secured to the forward face of the housing 29 for locking the antifriction thrust bearing sleeve 34 in position within the counterbore 33 between itself and a shoulder 39 formed by the counterbore 33. Revolubly mounted within the cap nut 44 and thrust bearing 37 and carrying the intermediate race 41 therewith is a shaft or arbor 45 provided on its one end with a lock nut 46. The complementary contour of flanges 35 and 38 and end races 36 and 40 form a rolling ball joint so that the center of the shaft or arbor 45 may move through a limited orbital path relative to the actual center of housing 29. A dust cap 47 is secured by means of a set screw 48 to the arbor or shaft 45 and encloses the forward end of the housing 29 having the flange thereof spaced from the periphery of the housing 29 so as not to interfere with the floating movement of the said arbor or shaft. By this construction no interference is offered to the rotation of the work piece by the grinding wheel and its control by the regulating wheel and the work piece may float along the inclined top of the work rest blade 26 during grinding as is usual in a centerless grinder.

The inner end of the arbor 45 is provided with an enlarged portion 49 of a size substantially equal to the size of the finished work piece and forms a stop to limit the insertion of the work piece within the grinding throat In addition the enlarged portion or collar 49 rides on the upper surface of the work rest blade and determines the axis about which the arbor and supported work piece rotate. By this construction the outer surface of the work piece is reduced and finished concentric to the axis and inner surface of the finished bore therein. A reduced portion 50 is provided on the arbor 45 extending forwardly of the enlarged portion or collar 49 and is adapted to be inserted within the bore of the work piece and frictionally engages the work piece so that the work piece and arbor rotate as a unit with the regulating wheel primarily in engagement with the surface of the work piece to control its rotation.

However, when the outer surface of the work piece is eccentric to the finished bore therein and it is desired to clean up this outer surface and reduce same concentric to said bore the regulating wheel may engage the sleeve 49 to thereby control the rotation of the work piece and arbor as shown in Figure 7 in a somewhat exaggerated scale. In operation hand lever 50' secured to nut 24 is utilized for normally feeding the regulating wheel toward the grinding wheel to feed the work piece into the grinding wheel to effect a stock removal therefrom. The movement of the lever 50' is such that it is actuated through 90° from the position shown in Figure 5 toward the front of the machine, at which time the lever is returned to the position shown. Coupled with the lever 50' to automatically eject a work piece from the grinding throat upon completion of the grinding operation is a slide bar 51 having a lost motion slot 52 forming a shoulder 53 to be engaged by a pin 54 extending from the rear of the lever 50'.

The other end of the slide bar 51 has formed thereon a tooth 55 engaging a shoulder 56 formed on a collar 57 secured to rock shaft 58. Rock shaft 58 extends across the front of the machine to the grinding throat and is rotatably supported in bearings 59 secured to the lower slide. At the inner end of the rock shaft 58 a crank 60 is secured having a pin 61 extending therefrom and received in a notch 62 formed in a block 63 secured to the end of shift rod 64. Shift rod 64 is slidably mounted in lugs 65 extending from the block 25 and at the rear thereof has a pin and slot connection 66 with a lever 67 pivoted at 68 to the bracket 28 and the lever 67 having a similar pin and slot connection 69 at the upper end thereof with the ejector shaft 70. Ejector shaft 70 slides through a guide sleeve 71 carried by an extension 72 from the block 25 and being guided by guide pin 73 carried by the guide sleeve 71 working in a slot or spline 73a formed in slide rod 70. A Y shaped ejector member 74 is mounted on the forward end of ejector shaft 70 and is provided with arms 75 and 76 straddling the reduced portion of the work piece being ground and engaging with the rear surface of an enlarged boss or portion thereon. Shift rod or shaft 64 is provided intermediate its ends with a collar 77 forming one abutment for a spring 78 abutting on its opposite end with one of the bearing lugs 65. The spring is compressed or tensioned during the ejection of a work piece and on completion of the ejection expands to return the parts to their normal position and retracts the ejector member 74.

The complete operation of the device is as follows: Clamps 16 and 17 are loosened and hand or pilot wheel 23 actuated to rotate the screw and adjust the relative positions of the grinding and regulating wheels to form a grinding throat of the proper size and to position arbor or shaft 45 relative to the grinding throat. A work piece is placed on the reduced end of the arbor 45 abutting the collar 49. Lever 50' is actuated in a counter-clockwise direction or toward the front of the machine to partially rotate nut 24, and feed the regulating wheel and work toward the grinding wheel for effecting a stock removal therefrom. The construction of the anti-friction thrust bearing permits a floating gyratory action of the arbor during the grinding operation thereby permitting the work piece to automatically adjust itself on the angle top work rest while being ground. At the completion of the grinding operation the lever 50' is actuated in a clockwise direction or to a normal position. In so doing pin 54 engages the shoulder 53 on slide shaft 51 partially rotating rock shaft 58 and through the lever and block connection 60—63 shifts slide shaft 64 for actuating lever 67 about its pivot 68 and compresses spring 78. This actuation of the lever 67 through the sliding connection at 69 causes the ejector shaft 70 to forcibly push or kick the work piece from the grinding throat whereupon the spring 78 expands to return the parts to their normal position when an unfinished work piece may be mounted on the end or arbor 45 and the above cycle repeated.

What is claimed is:

1. In a device of the class described the combination of opposed grinding and regulating wheels forming a grinding throat therebetween, a work rest blade within the throat peripherally supporting a work piece during grinding, a rotatable arbor within the throat held against axial movement relative thereto and receiving the work piece for determining the ultimate axis of rotation of the work, and means for ejecting said work piece from the arbor after completion of the grinding operation.

2. In a centerless grinder for grinding the outer surface of a work piece concentric with a finished bore therein comprising a pair of opposed grinding and regulating wheels forming a grinding throat therebetween, a work rest blade within the throat peripherally supporting the work piece during grinding and means within the grinding throat held against movement axially thereof and receiving the work piece or for determining the ultimate axis about which the rotation of the work piece takes place.

3. In a centerless grinder, the combination with opposed grinding and regulating wheels forming a grinding throat therebetween, of a work support for presenting a work piece to the grinding wheel comprising a work rest blade, a rotatable arbor received within the bore in the work piece for determining the axis of rotation of the work while being supported by the blade, anti-friction means supporting the arbor for rotation, a housing therefor, and means supporting the work rest blade arbor, anti-friction means, and housing as a unit relative to the grinding throat.

4. In a centerless grinder the combination of a pair of opposed grinding and regulating wheels forming a grinding throat therebetween, a work rest within the thoat peripherally supporting a work piece during grinding, a rotatable arbor within the grinding throat carrying the work piece and anti-friction means for the arbor.

5. In a centerless grinder the combination of a pair of opposed grinding and regulating wheels forming a grinding throat therebetween, a work rest within the throat peripherally supporting a work piece during grinding, a rotatable arbor within the grinding throat carrying the work piece and means supporting the arbor for rotation about an axis movable in an orbital path.

6. In a centerless grinder the combination of a pair of opposed grinding and regulating wheels forming a grinding throat therebetween, a work rest within the throat peripherally supporting a work piece during grinding, a rotatable arbor within the grinding throat carrying the work piece, means supporting the arbor for rotation about an axis movable in an orbital path and means stripping the work piece from the arbor and ejecting same from the grinding throat.

7. In a centerless grinder, the combination of a pair of opposed grinding and regulating wheels forming a grinding throat therebetween, a work rest within the throat peripherally supporting a work piece during grinding, a rotatable arbor within the grinding throat carrying the work piece, means supporting the arbor for rotation about an axis movable in an orbital path, means stripping the work piece from the arbor and ejecting same from the grinding throat, and means carried by the arbor limiting the insertion of the work piece within the grinding throat.

8. In a centerless grinder, the combination of a pair of opposed grinding and regulating wheels forming a grinding throat therebetween, a work rest within the throat peripherally supporting a work piece during grinding, a rotatable arbor within the grinding throat carrying the work piece, means supporting the arbor for rotation about an axis movable in an orbital path, means stripping the work piece from the arbor and ejecting same from the grinding throat, means carried by the arbor limiting the insertion of the work piece within the grinding throat, and means returning the ejecting and stripping means to its normal position.

9. In a centerless grinder, the combination of a work rest blade peripherally supporting a work piece during grinding, a grinding member on one side of the blade, a rotation controlling member on the opposite side of the blade, a rotatable arbor between the grinding and regulating members supporting the work piece for rotation about the axis thereof, means supporting the arbor for movement in an orbital path and means for advancing and retracting the rotation controlling member with respect to the grinding member to effect a stock removed from the work piece.

10. In a centerless grinder, the combination of a work rest blade peripherally supporting a work piece during grinding, a grinding member on one side of the blade, a rotation controlling member on the opposite side of the blade, a rotatable arbor between the grinding and regulating members supporting the work piece for rotation about the axis thereof, means supporting the arbor for movement in an orbital path, means for advancing and retracting the rotation controlling member with respect to the grinding member to effect a stock removal from the work piece, and means automatically stripping the work piece from the arbor and ejecting same from between the grinding and rotation controlling members while the said rotation controlling member is being retracted.

11. In a centerless grinder the combination of opposed grinding and regulating wheels forming a grinding throat therebetween, a rotatable arbor within the grinding throat adapted to be received within a bore in the work piece, and means for stripping the work piece from the arbor and ejecting same from the grinding throat including an ejector member, a shift rod, a pivotally mounted lever having a sliding connection at each end one with the ejector member and one with the shift rod, a forked shoe carried by the shifter member for engagement with an enlarged portion of the work piece and means actuating the shift rod to correspondingly actuate the shifter member causing the forked shoe to strip the work piece from the arbor and eject same from the grinding throat.

12. In a centerless grinder the combination of opposed grinding and regulating wheels forming a grinding throat therebetween, a rotatable arbor within the grinding throat adapted to be received within a bore in the work piece, and means for stripping the work piece from the arbor and ejecting same from the grinding throat including an ejector member, a shift rod, a pivotally mounted lever having a sliding connection at each end one with the ejector member and one with the shift rod, a forked shoe carried by the shifter member engaging an enlarged portion of the work piece, means actuating the shift rod to correspondingly actuate the shifter member causing the forked shoe to strip the work piece from the arbor and eject same from the grinding throat, and yielding means for returning the parts to their normal positions after ejection of the work piece.

13. In a centerless grinder for grinding the outer surface of a hollow work piece concentric with the bore thereof comprising a pair of opposed grinding and regulating wheels forming a grinding throat therebetween, a work rest blade within said throat, a rotatable arbor in the throat received in the bore in the work piece for determining the axis of rotation of the work piece and for holding same on the work rest blade, and means on the arbor determining the position of the work on the arbor and adapted to be engaged by the regulating wheel for effecting rotation of the arbor and the work when the work is substantially to size.

14. In a centerless grinder for grinding the outer surface of a hollow work piece concentric with the bore thereof comprising a pair of opposed grinding and regulating wheels forming a grinding throat therebetween, a work rest blade within said throat, a rotatable arbor in the throat received in the bore in the work piece for determining the axis of rotation of the work piece and for holding same on the work rest blade, means on the arbor determining the position of the work on the arbor and adapted to be engaged by the regulating wheel for effecting rotation of the arbor and the work when the work is substantially to size, and means for supporting the arbor for orbital movement whereby the work is floatingly retained in the grinding throat.

15. In a centerless grinder for grinding the outer surface of a hollow work piece concentric with the bore thereof comprising a pair of opposed grinding and regulating wheels forming a grinding throat therebetween, a work rest blade within said throat, a rotatable arbor in the throat received in the bore in the work piece for determining the axis of rotation of the work piece and for holding same on the work rest blade, means on the arbor determining the position of the work on the arbor and adapted to be engaged by the regulating wheel for effecting rotation of the arbor and the work when the work is substantially to size, means for supporting the arbor for orbital movement whereby the work is floatingly retained in the grinding throat, and means for stripping the work from the arbor.

In testimony whereof I affix my signature.

GEORGE W. BINNS.